United States Patent [19]

Röhm

[11] 4,130,290
[45] Dec. 19, 1978

[54] RADIAL-JAW CHUCK FOR LATHES AND LIKE TURNING MACHINES

[76] Inventor: Günter H. Röhm, Heinrich-Röhm-Str. 50, 7927 Sontheim, Germany

[21] Appl. No.: 846,451

[22] Filed: Oct. 28, 1977

[30] Foreign Application Priority Data

Oct. 28, 1976 [DE] Fed. Rep. of Germany ....... 7633955 [U]

[51] Int. Cl.² .......................... B23B 5/22; B23B 5/34; B23B 31/16; B25G 3/22
[52] U.S. Cl. ................................................. 279/121
[58] Field of Search ................ 279/1 F, 1 TE, 66, 70, 279/74, 110, 114, 117, 121

[56] References Cited

U.S. PATENT DOCUMENTS

| | | | |
|---|---|---|---|
| 1,594,716 | 8/1926 | Forkardt | 279/114 |
| 3,698,729 | 10/1972 | Scharfen et al. | 279/117 X |
| 3,704,022 | 11/1972 | Blattry et al. | 279/121 |
| 3,782,742 | 1/1974 | Fink et al. | 279/117 X |

FOREIGN PATENT DOCUMENTS

2323230  11/1974  Fed. Rep. of Germany ........... 279/121

*Primary Examiner*—Robert Louis Spruill
*Attorney, Agent, or Firm*—Karl F. Ross

[57] ABSTRACT

A radial-jaw chuck for lathes and like turning machines comprises a chuck body having a central jaw-tightening member, e.g. a sleeve, which by respective projections engages respective axially displaceable pins. The pins, in turn, are connected with chordal wedge bars by respective wedge mechanisms so that axial displacement of the pins shifts the wedge bars along the respective chords. The wedge bars, in addition, are connected with the respective chuck jaws by inclined-tooth arrangements so that the axial displacement of the tightening member causes radial displacement of the jaws.

10 Claims, 3 Drawing Figures

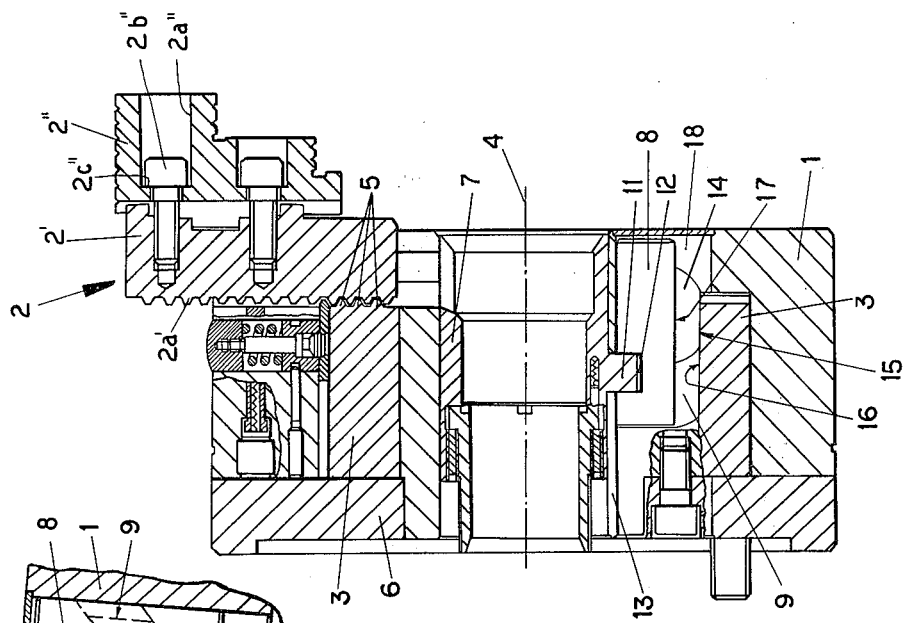
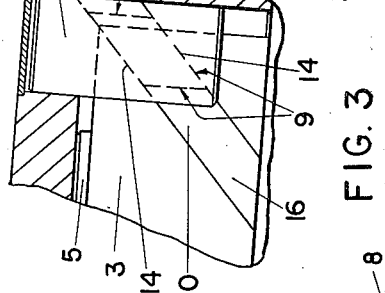
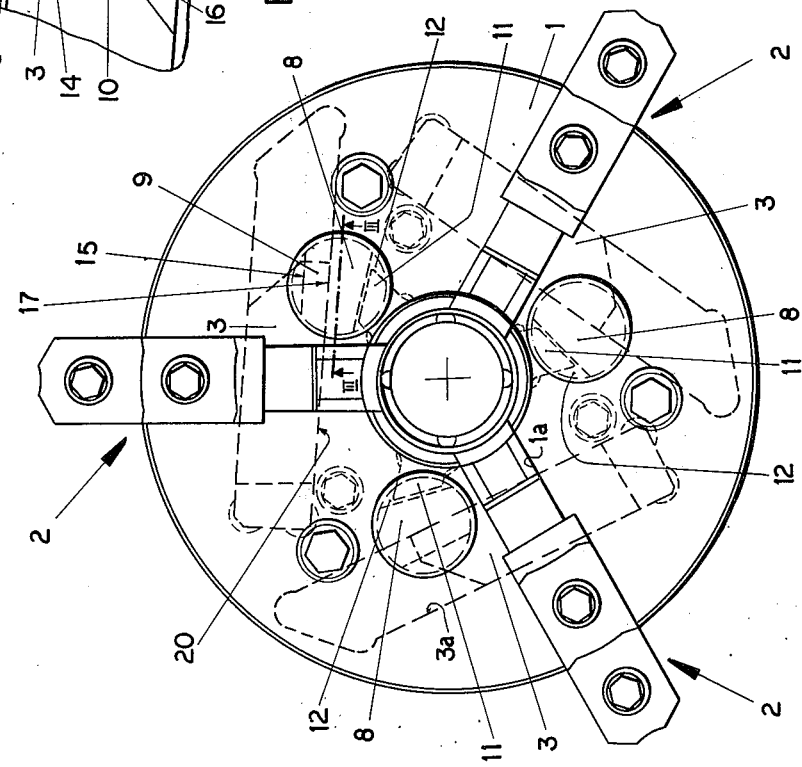

RADIAL-JAW CHUCK FOR LATHES AND LIKE TURNING MACHINES

FIELD OF THE INVENTION

The present invention relates to a radial-jaw chuck for turning machines and the like and, more particularly, to a universal chuck for a lathe which can be tightened by a draw bar or the like extending through the hollow spindle of the turning machine.

BACKGROUND OF THE INVENTION

It has been proposed heretofore to provide so-called universal or radial-jaw chucks with a common tightening member which can be axially displaced by a draw bar or tube running through the hollow spindle of the turning machine on which the operating mechanism may be provided at the remote end of the hollow spindle to pull a draw bar through the latter and thereby tighten the jaws of the chuck against their workpiece.

To this end, the chuck body which is mounted on the proximal end of the hollow spindle, can be formed with a plurality of angularly equispaced radially displaceable jaws which are urged toward the workpiece to grip the same or away from the workpiece to release the latter.

In prior-art systems of this type, the central tightening member is axially displaceable and cooperates via inclined teeth with the meshing or interdigitating teeth of a rack formed on the back of each of the chuck jaws.

This system has been found to have the disadvantage that it applies a torque or torsional stress to the tightening body and requires complex means for preventing rotation thereof. Nonetheless, when the tightening body is a tube, some mechanical distortion must be contemplated.

To prevent such torsional stresses from arising or to take up the torsional stresses and insure effective guidance or resistance to rotation, the chuck body must be modified in a manner which tends to weaken it.

OBJECTS OF THE INVENTION

It is the principal object to the present invention to provide an improved chuck which obviates the disadvantages set forth above.

Another object of the invention is to provide a radial-jaw or so-called universal chuck with improved means for actuating the jaws in common whereby the chuck body is not weakened, the central or common tightening member is not unduly stressed, and other drawbacks of earlier systems are precluded.

SUMMARY OF THE INVENTION

These objects and others which become apparent hereinafter are retained in accordance with the present invention, in a radial-jaw chuck which comprises a chuck body having the plurality of angularly equispaced jaws displaceable radially on the body and formed on their rear faces with respective racks having inclined teeth.

According to this invention, the means for displacing the jaws in common comprises an axially shiftable tightening member which is mounted centrally in the body and which, through respective projections, engages a plurality of axially shiftable force-transmitting pins, the pins being guided only for axial displacement in the chuck body.

According to a feature of the invention, each of the pins is connected by a wedging mechanism with a respective wedge bar which, in turn, is shiftable transversely of the axis of the body along a chord and cooperates with the rack on the back of a respective jaw.

In other words, there is now interposed between the common jaw-tightening member, which is axially shiftable, and each of the jaws, the combination of a drive pin which is axially shiftable with the latter member and a wedge bar which is cammed along a chordal path by the respective pin, the wedge bar, in turn, engaging the jaws to displace the same radially.

According to a feature to the invention the common tightening member is provided with entraining projections which are axially slideable in respective axial slots of the chuck body and engage in respective transverse grooves of the respective drive pin.

According to another feature of the invention, the wedge mechanism coupling each of said pins with the respective wedge bar comprises an inclined tooth on the pin directly opposite the projection of the common tightening member engaged therewith. The inclined tooth, in turn, engages in a correspondingly inclined groove of the wedge body.

The drive pins are each formed of a circular cylindrical outline, but with flattened guide surfaces ahead of and behind the respective drive tooth so that these surfaces rest upon the planar underside of the respective wedge bar, thereby preventing each pin from rotating and forming a guide for each pin and the respective wedge bar.

According to another feature of the invention, the drive tooth itself is formed with a planar head surface which rides upon a planar bottom surface of the inclined groove of the wedge bar. Such a guidance has been found to be effective in distributing the forces on the drive pin with a high degree of symmetry, especially when the transverse groove for the projection is directly opposite the drive tooth.

The construction of the present invention has the advantage that practically the entire length of the chuck body can be used for the guidance and stroke of each of the drive pins without a weakening of the chuck body. This is because each of the drive pins requires only a simple bore drilled in the chuck body and an axially extending slit or slot which has no significant effect on the strength of the structure. In fact, the slot need only be provided in the rear portion of the chuck body over a length corresponding to the stroke length of the tightening member.

As a consequence, the chuck body has a high degree of stiffness and resistance to distortion and the workpiece engaging process is highly reproducible.

In addition, for a given stroke, the drive pins are guided over a relatively long length in spite of a relatively small overall axial length of the chuck body. Finally, the tightening member remains completely free from torsional stress since it engages the drive pins only axially.

BRIEF DESCRIPTION OF THE DRAWING

The above and other objects, features and advantages of the present invention will become more readily apparent from the following description, reference being made to the accompanying drawing in which:

FIG. 1 is a front view of a radial chuck embodying the present invention, partially shown diagrammatically;

FIG. 2 is a cross-sectional view in an axial plane through the chuck of FIG. 1; and FIG. 3 is a detail view, drawn to an enlarged scale, in cross-section along the line III—III of FIG. 1

SPECIFIC DESCRIPTION

In FIGS. 1 through 3 of the drawing, I have shown a radial jaw and so-called universal chuck which comprise a circular chuck body 1 in which a plurality of angularly spaced chuck jaws 2 are radially displaceable in respective guideways 1a of the body 1.

Each of the chuck jaws comprises a base jaw 2' and a replaceable outer jaw member 2" (see FIG. 2), the outer jaw member 2" being formed with a pair of bores in which respective capscrews 2b" are fitted. The bores 2a" are provided with shoulders 2c" against which the heads of the capscrews 2b" bear. By removing the screws 2b", the outer jaw members 2" can be replaced in response to wear or reversed as required.

To displace the radial jaws 2, which engage the workpiece between them, there are provided wedge bars 3 which are shown in broken lines in FIG. 1 and in cross-section in FIG. 2.

Each of the wedge bars 3 lies along a chord of the body 1 and is guided in a slideway 3a for movement generally transverse to the chuck axis 4.

Each wedge bar 3 is provided with inclined teeth 5 which engage in the interstices between similarly inclined teeth of a rack constituted by the reverse side of the base jaw member 2'. The racks have been represented at 2a".

Thus, as each of the wedge bars 3 is displaced in its track 3a, the respective jaw 2 will be radially displaced toward or away from the axis 4.

The chuck body 1 is provided on its rear side with a flange 6 whereby the chuck can be mounted upon a hollow lathe spindle (not shown). At the center of the chuck body there is provided an axially shiftable tightening member in the form of a sleeve, the tightening member being represented at 7. This tightening member 7 can be connected to the draw bar traversing the hollow lathe spindle and which emerges from the opposite end thereof for the manual or fluid-pressure tightening of the chuck, e.g. by a fluid-operated cylinder. The means whereby the sleeve 7 is connected to the draw bar or tube has not been illustrated and may be a screw thread or the like formed on the sleeve 7.

Between the tightening sleeve 7 and each wedge bar 3, there is provided within the chuck body 1 an axially shiftable driving pin 8. Each driving pin 8 is formed with a lateral cutout or opening into which a lateral projection of the sleeve 7 can extend, these elements being described in greater detail below. In any case, the drive pins are connected with the sleeve 7 for joint axial displacement therewith and, in addition, are coupled with a wedging mechanism best seen in FIG. 3 and represented at 9 and 10.

More specifically, each of the chuck jaws is associated with a respective entraining projection 11 which traverses a respective axial slot 13 in the body 1 to project into a transverse groove 12 formed in the respective pin 8.

The wedge mechanism 9, 10 comprises an inclined driving tooth 9 formed on the respective drive pin 8 and inclined to the axis of the drive pin as well as to the axis of the respective wedge bar 3. Each of the drive teeth 9 engage slideably in a correspondingly inclined groove 10 formed in the respective wedge bar 3.

Consequently, as each of the drive pins 8 is axially displaced, the wedge mechanism 9, 10, by the sliding interaction of the tooth 9 and the groove 10, causes a corresponding transverse displacement of the wedge bar 3.

The drive pin 8 is preferably of circular cylindrical configuration except for the projection 9 and is guided in an axially extending bore 18 of the chuck body 1.

The drive tooth 9 is so formed that the pin 8 has axially ahead of and behind the drive tooth a planar guide surface 17 which rests upon the underside 20 of the wedge bar 3 and affords an additional guidance for this wedge bar and the respective pin. This surface, in addition, prevents rotation of the pin about its axis.

In addition, the drive tooth 9 can have a planar head surface 15 which rides in the planar bottom surface 16 of the inclined groove 10 of the wedge bar 3.

The drive tooth 9 is provided at a location along the length of the drive pin 8 which is approximately at its center. The transverse groove 12 for the projection 11 is most advantageously diammetrically opposite the drive tooth 9 to ensure a highly desirable symmetrical force distribution within the drive pin 8. This also, of course, enables the drive pin 8 to be relatively long by comparison with its diameter, an advantage in ensuring a precise guidance of the drive pin whereby the pin and its displacement path can extend the full axial length of the chuck body 1.

This means that for a given stroke length and end to end length of the pin 8, the chuck body can have a small axial length and, conversely, for a given axial length of the chuck body, the length of the pin or the length of its displacement path can be relatively large.

The slot 13 for the projection 11 extends only in the rear portion of the chuck body 1 and only over the length of the stroke of the pin 8.

In practice it has been found that provision of the bores 18 for the drive pins 8 and the slot 13 for the projections 11 do not significantly weaken the chuck body 1.

In operation, the jaws 2 are urged against a workpiece positioned centrally between them by drawing upon the tightening sleeve 7 in the manner described. This axially displaces each of the pins 8 causing the respective wedge mechanisms 9, 10 to displace the wedge bars 3 along their respective chordal path, thereby causing the teeth 5 to displace the racks 2a' inwardly. The opening of the chuck takes place in the opposite way.

I claim:

1. A radial-jaw chuck for a turning machine having a spindle and means for tightening the chuck, said chuck comprising
   a chuck body adapted to be mounted on said spindle and having an axis;
   a plurality of jaws radially shiftable on said body toward and away from said axis, each of said jaws being formed with an array of inclined teeth on a surface of the jaw;
   respective wedge bars displaceable in said body in directions transverse to said axis and formed with teeth engaging the teeth of said jaws for radially displacing the respective jaws upon linear displacement of each bar;
   a tightening member axially shiftable on said body by said means for tightening the chuck;
   respective drive pins axially shiftable in said body and engaged by said member for axial displacement thereby; and a respective wedge mechanism between each of said pins and the respective bar for translating axial displacement of the respective pin into corresponding linear displacement of the respective bar.

2. The chuck defined in claim 1 wherein said member is provided for each pin with a respective lateral projection, said chuck body having respective axial slides through which said projections extend, each of said pins having a laterally open groove receiving a respective one of said projection for axial entrainment of said pins with said member.

3. The chuck defined in claim 2 wherein each of said wedge mechanisms includes an inclined drive tooth formed on each pin and a respective inclined groove formed on each bar and slideably receiving the respective tooth, said grooves on said bars and said teeth on said pins being inclined to the direction of linear displacement of the respective bar and to the axis of the respective tooth.

4. The chuck defined in claim 3 wherein said pins are each of circular cylindrical configuration with flat surfaces axially ahead of and behind the respective drive tooth, said surfaces engaging a corresponding flat surface formed on the respective bar.

5. The chuck defined in claim 3 wherein each of said drive teeth is formed with a planar head surface slideably engaging a planar bottom surface of the respective groove of the respective bar.

6. The chuck defined in claim 3 wherein the transverse groove of each pin lies substantially directly opposite the drive tooth thereof.

7. The chuck defined in claim 6 wherein each of said jaws includes a base jaw member provided with a piece engaging the respective bar and a removable outer jaw member bolted to the respective back jaw member.

8. The chuck defined in claim 7 wherein said tightening member is a sleeve axially displaceable in said chuck body.

9. The chuck defined in claim 8 wherein three such radial jaws are provided in angular equi-spaced relation on said chuck body.

10. The chuck defined in claim 9 wherein said body is formed with respective axial bores each receiving a respective one of said pins.

* * * * *